(12) United States Patent
Bose et al.

(10) Patent No.: US 8,295,341 B2
(45) Date of Patent: Oct. 23, 2012

(54) COGNITIVE RADIO DEVICE

(76) Inventors: Tamal Bose, Blacksburg, VA (US); Barathram Ramkumar, Blacksburg, VA (US)

( * ) Notice: Subject to any disclaimer, the term of this patent is extended or adjusted under 35 U.S.C. 154(b) by 482 days.

(21) Appl. No.: 12/609,011

(22) Filed: Oct. 30, 2009

(65) Prior Publication Data

US 2011/0103454 A1 May 5, 2011

(51) Int. Cl.
*H04L 27/01* (2006.01)
(52) U.S. Cl. ........ 375/232; 375/316; 375/229; 375/231; 375/233; 375/267; 375/349
(58) Field of Classification Search .................. 375/232, 375/316, 229, 231, 233, 267, 349
See application file for complete search history.

(56) References Cited

OTHER PUBLICATIONS

Novel Automatic Modulation Classification Using Cumulant Features for Communication via Multipath Channels by Hsiao-Chun Wu, Mohammad Squib, and Whiffing Yun, dated 2008.*
"Combined Blind Equalization and Automatic Modulation Classification for Cognitive Radios" by Barathram Ramkumar, Tamal Bose, Miloje S. Radenkovic, presented on Jan. 2009 and dated 2009.*
Fehske, Gaeddert and Reed; A New Approach to Signal Classification Using Spectral Correlation and Neural Networks; Article; 2005; pp. 144-150; Virginia Polytechnic Institute and State University, Blacksburg, VA. USA.
Gardner, Measurement of Spectral Correlation: Article; Oct. 1986; pp. 1111-1123; Vol. ASSP, No. 5; USA.
Gardner and Spooner; Signal Interception: Performance Advantages of Cyclic-Feature Detectors; Article, pp. 149-159; Jan. 1992; vol. 40, No. 1; USA.
Haykin; Cognitive Radio: Brain-Empowered Wireless Communications; Article; pp. 201-220: vol. 23, No. 2; Feb. 2005; USA.
Godard; Self-Recovering Equalization and Carrier Tracking in Two-Dimensional Data Communication Systems; Article; vol. COM-28 No. 11, Nov. 1980; pp. 1867-1875; USA.
Kim, Akbar, Bae, Um, Spooner and Reed, Article; 2007; pp. 212-215; USA.
Li and Liu; Article; On Blind Equalization of MIMO Channels; Article; 1996; pp. 1000-11304: USA.
Radenkovic and Bose; Blind Adaptive Equalizer for IIR Channels With Common Zeros; Article; 2006; pp. 4195-4198; USA.
Radenkovic and Bose; A Recursive Blind Adaptive Equalizer far IIR Channels. with Common Zeros; Article; 2009; pp. 12 pgs: USA.
Roberts, Brown and Loomis, Jr.; Computationally Efficient Algorithms for Cyclic spectral Analysis; Article; Apr. 1991; pp. 38-49; SP Magazine; USA.
Swami and Sadler; Hierarchical Digital Modulation Classification Using Comulants; Article; Mar. 2000; vol. 48, No. 3; USA.
Treichler and Larimore: New Processing Techniques Based on the Constant Modulus Adaptive Atgorithm; Article; Apr. 1985; vol. ASSP-33, No. 2; pp. 420-439: USA.
Treichler and Agee; A New Approach to Multipath Correction of Constant Modules Signals; Article; Apr. 1983; vol. ASSP-31, No. 2; pp. 459-472; USA.

(Continued)

*Primary Examiner* — Siu Lee
(74) *Attorney, Agent, or Firm* — Jensen & Puntigam, PS

(57) ABSTRACT

An example Cognitive Radio (CR) described herein may include equalization and Automatic Modulation Classification (AMC). The equalization may employ digital filter techniques with an adjustable length or order. The output of the equalization may be provided to the AMC, where the AMC may be adapted to identify various characteristics about the RF environment and also to identify probabilities of classification associated with the performance of the AMC itself. The CR device may be configured to adjust the equalization using feedback from the AMC to enhance performance of each other.

24 Claims, 10 Drawing Sheets

OTHER PUBLICATIONS

Wu, Wu, Principe, and Wang; Robust Switching Blind Equalizer for Wireless Cognitive Receivers; Article; May 2008; vol. 7, No. 5; pp. 1461-1465; USA.

Xi, and Wu: Robust Automatic Modulation Classification Using Cumulant Features in the Presence of Fading Channels; Article 2006; pp. 2094-2098: USA.

Polson; Cognitive Radio Applications in Software Defined Radio; Article; 2004; 6 pgs; USA.

Ramkumar, B., et al., "Combined Blind Equalization and Automatic Modulation Classification for Cognitive Radios Under MIMO Environment," Proceedings of the SDR '08 Technical Conference and Product Exposition, pp. 6.

Roberts, R.S., "Computationally eflcient algorithms for cyclic spectral analysis," IEEE Signal Processing Mag, Apr. 1991, vol. 8, Issue:2, pp. 38-49.

* cited by examiner

COGNITIVE RADIO DEVICE

BACKGROUND

Unless otherwise indicated herein, the materials described in this section are not prior art to the claims in this application and are not admitted to be prior art by inclusion in this section.

Cognitive Radio (CR) provides a model for wireless communication in which nodes may adaptively change transmission and/or reception parameters. CR promises more efficient and effective use of radio frequency spectrum by CR devices.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
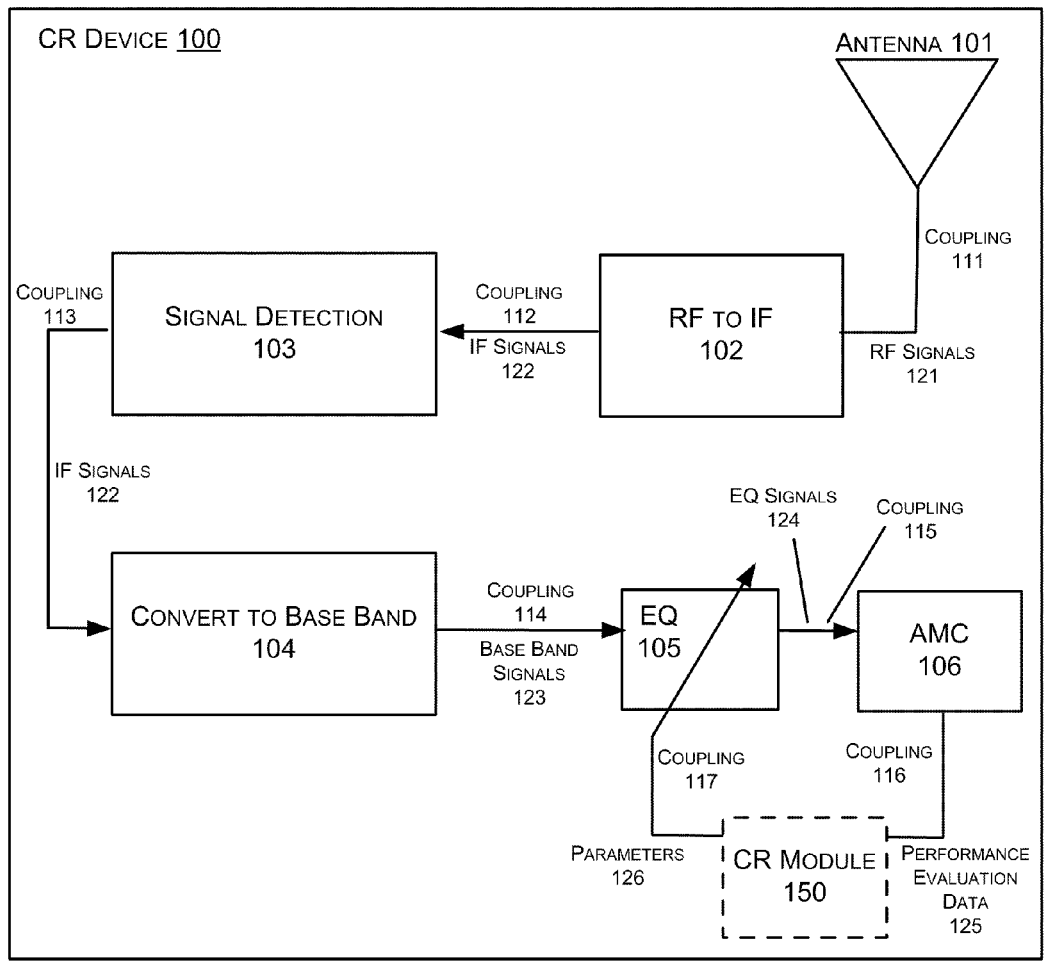
FIG. 1 is a block diagram of an example CR device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure is generally drawn, inter alia, to methods, devices, and/or systems related to Cognitive Radios (CRs). An example CR may include equalization and Automatic Modulation Classification (AMC). The equalization may employ digital filter techniques with an adjustable length or order. The output of the equalization may be provided to the AMC, where the AMC may be adapted to identify various characteristics about the RF environment and also to identify probabilities of classification associated with the performance of the AMC itself. The CR device may be configured to adjust the length or order of the equalization using feedback from the AMC to enhance performance of each other.

FIG. 1 is a block diagram of a CR device 100 that is arranged in accordance with at least some embodiments of the present disclosure. The example CR device 100 includes one or more blocks such as an antenna 101, a Radio Frequency (RF) to Intermediate Frequency (IF) down conversion block 102, a signal detection block 103, a base band down conversion block 104, an equalizer block 105, a CR module block 150 and/or an Automatic Modulation Classification (AMC) block 106. Although CR device 100 is partitioned into discrete blocks, the functions provided by the blocks may be combined together into fewer blocks, separated into additional blocks, or eliminated depending on the desired physical implementation.

In FIG. 1, antenna 101 may be coupled to RF to IF conversion block 102 via coupling 111, over which RF signals 121 may be communicated. RF to IF down conversion block 102 may also be coupled to signal detection block 103 via coupling 112, over which IF signals 122 may be communicated. Signal detection block 103 may be coupled to base band down conversion block 104 via coupling 113, over which IF signals 122 may be communicated. Base band down conversion block 104 may be coupled to equalizer block 105 via coupling 114, over which base band signals 123 may be communicated. Equalizer (EQ) block 105 may be coupled to AMC block 106 via coupling 115, over which equalized (EQ) signals 124 may be communicated. AMC block 106 may be coupled to CR module block 150 via coupling 116, over which performance evaluation data 125 may be communicated. CR module block 150 may be coupled to EQ block 105 via equalizer feedback coupling 117, over which parameters 126 may be communicated.

FIG. 1 illustrates a CR device 100 in which the EQ block 105 and the AMC block 106 are arranged to cooperate with one another via feedback. Parameters of the EQ block 105 may be adjusted by the CR module 150 based on the performance of the AMC 106. In some example embodiments, CR module 150 may be configured to update parameters 126 used by EQ block 105, for example, weights associated with the EQ block 105. The CR module 150 may evaluate a performance evaluation data 125 associated with the AMC block 106, and determine parameters 126 by minimizing a cost function that is associated with the performance evaluation data 125. Performance evaluation data 125 may also be referred to herein as performance criteria. In some embodiments, determination of parameters 126 by CR module 150 may comprise operation of an algorithm such as algorithm 430, discussed in connection with FIG. 4, as may be implemented in a CR module 150 in a computing device as discussed in connection with FIG. 2. Example cost functions are also discussed in detail below.

In some embodiments, CR device 100 may be configured to sense, identify and/or characterize various characteristics about the RF environment and adapt accordingly by subsequently using the characteristics in RF signal processing. For example, a detected modulation scheme characteristic may be used to interpret received RF signals, as well as communicate by employing the modulation scheme characteristic in RF transmissions. EQ block 105 may for example comprise a blind equalizer which may be used in conjunction with the other components of FIG. 1 to recover an input sequence received at antenna 101. The blind equalizer has the characteristic that the input sequence may be inferred from the received signal using statistics associated with the received signal. Thus, the blind equalizer may apply statistics to the received RF signals 121 with no prior knowledge of the communication channel associated with the RF signals 121.

A Constant Modulus Algorithm (CMA) is one example of a blind equalization algorithm which may be used by EQ block 105 for Single Input Single Output (SISO) systems. CMA may also be adapted for use with EQ block 105 in Multiple Input Multiple Output (MIMO) systems. A CMA equalizer may perfectly recover at least one of the input sequences from the output of a Multiple Input Multiple Output Finite Impulse Response (MIMO-FIR) channel, thus reducing Co-Channel Interference (CCI) and Inter Symbol Interference (ISI).

AMC 106 may improve the spectral efficiency of the CR device 100 by adapting transmission according to the various conditions associated with the spectral environment. In some embodiments AMC block 106 may use cyclostationary based signal detection and pattern matching techniques. In some embodiments AMC block 106 may also use Neural Networks trained using Cyclic Domain Profiles (CDP) for signal classification due to their good pattern matching capabilities. An AMC block 100 as described herein may be configured to provide good performance with low Signal-To-Noise Ratios (SNR).

When channel information is not known, choosing a length of the equalizer 105 may be a difficult task. A unified framework for a MIMO CR device 100 may be used in accordance with this disclosure, in which MIMO based CMA may be adapted for use with AMC block 106. The order of a blind equalizer 105 may be adjusted based on the probability of classification associated with the AMC block 106.

Figure 2:
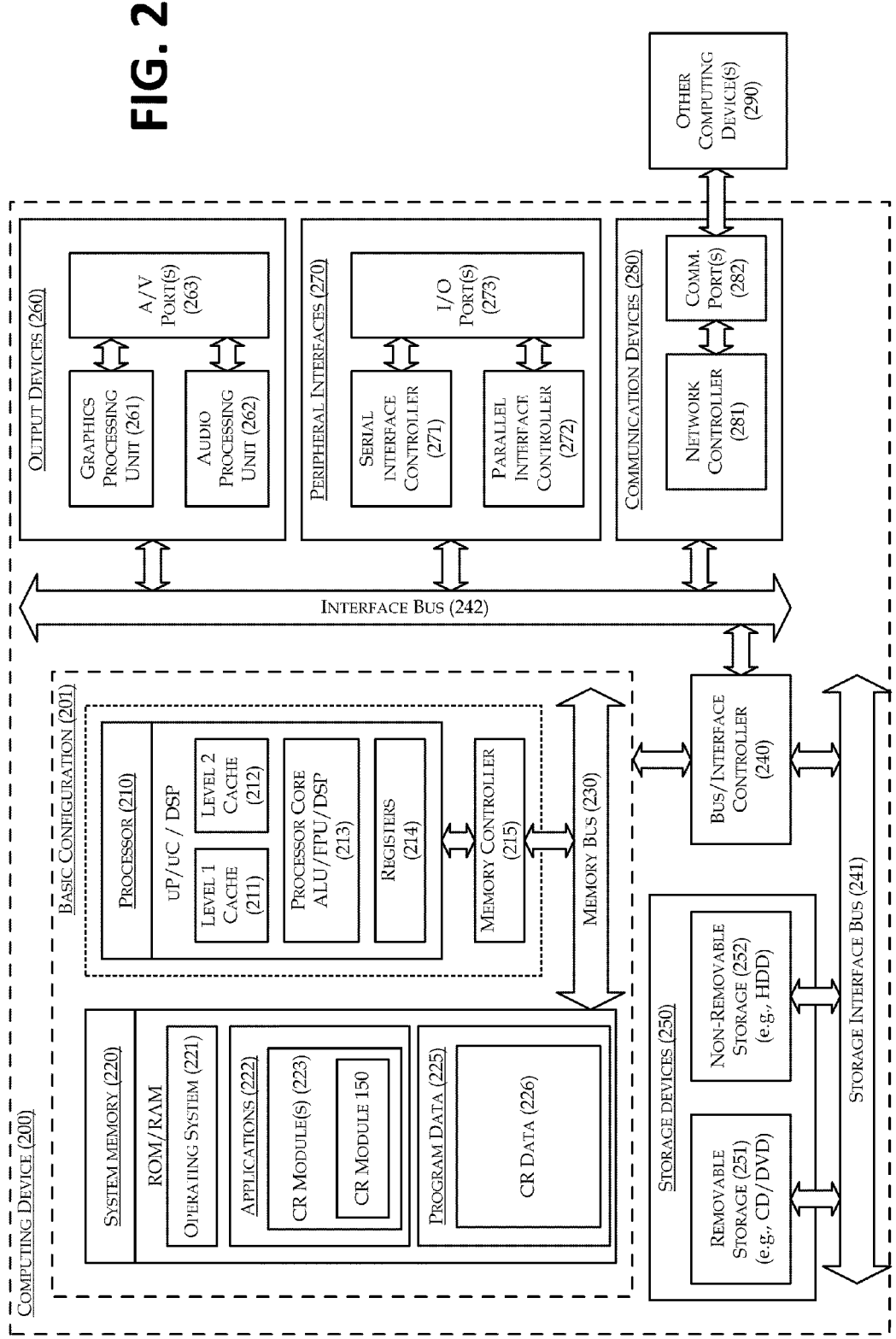
FIG. 2 is a block diagram of a computing device as one example of a computing device.

FIG. 2 is a block diagram of a computing device 200 as one example of a computing device 200 arranged in accordance with at least some embodiments of the present disclosure. In a very basic configuration 201, computing device 200 may typically include one or more processors 210 and system memory 220. A memory bus 230 may be used for communicating between the processor 210 and the system memory 220.

Depending on the desired configuration, processor 210 may be of any type including but not limited to a microprocessor (μP), a microcontroller (μC), a digital signal processor (DSP), or any combination thereof. Processor 210 may include one or more levels of caching, such as a level one cache 211 and a level two cache 212, a processor core 213, and registers 214. The processor core 213 may include an arithmetic logic unit (ALU), a floating point unit (FPU), a digital signal processing core (DSP Core), or any combination thereof. A memory controller 215 may also be used with the processor 210, or in some implementations the memory controller 215 may be an internal part of the processor 210.

Depending on the desired configuration, the system memory 220 may be of any type including but not limited to volatile memory (such as RAM), non-volatile memory (such as ROM, flash memory, etc.), or any combination thereof. System memory 220 typically includes an operating system 221, one or more applications 222, and program data 225. Applications 222 may include, for example, CR module(s) 223, which may comprise modules implementing one or more of the operations described herein, such as for example a CR module 150 adapted for evaluating AMC performance and adjusting equalizer parameters in accordance with the methods or processes described herein. Program data 226 may include CR data 226 that may be used by CR Module(s) 223, such as for example performance evaluation data 125.

Computing device 200 may have additional features or functionality, and additional interfaces to facilitate communications between the basic configuration 201 and any required devices and interfaces. For example, a bus/interface controller 240 may be used to facilitate communications between the basic configuration 201 and one or more data storage devices 250 via a storage interface bus 241. The data storage devices 250 may be removable storage devices 251, non-removable storage devices 252, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

System memory 220, removable storage 251, and non-removable storage 252 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 200. Any such computer storage media may be part of device 200.

Computing device 200 may also include an interface bus 242 for facilitating communication from various interface devices (e.g., output interfaces, peripheral interfaces, and communication interfaces) to the basic configuration 201 via the bus/interface controller 240. Example output devices 260 include a graphics processing unit 261 and an audio processing unit 262, which may be configured to communicate to various external devices such as a display or speakers via one or more A/V ports 263. Example peripheral interfaces 270 may include a serial interface controller 271 or a parallel interface controller 272, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 273. Other conventional I/O devices may be connected as well such as a mouse, keyboard, and so forth. An example communications device 280 includes a network controller 281, which may be arranged to facilitate communications with one or more other computing devices 290 over a network communication via one or more communication ports 282.

The computer storage media may be one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Computing device 200 may be implemented as a portion of a small-form factor portable (or mobile) electronic device such as a cell phone, a personal data assistant (PDA), a personal media player device, a wireless web-watch device, a personal headset device, an application-specific device, or a hybrid device that include any of the above functions. Computing device 200 may also be implemented as a personal computer including both laptop computer and non-laptop computer configurations.

Figure 3:
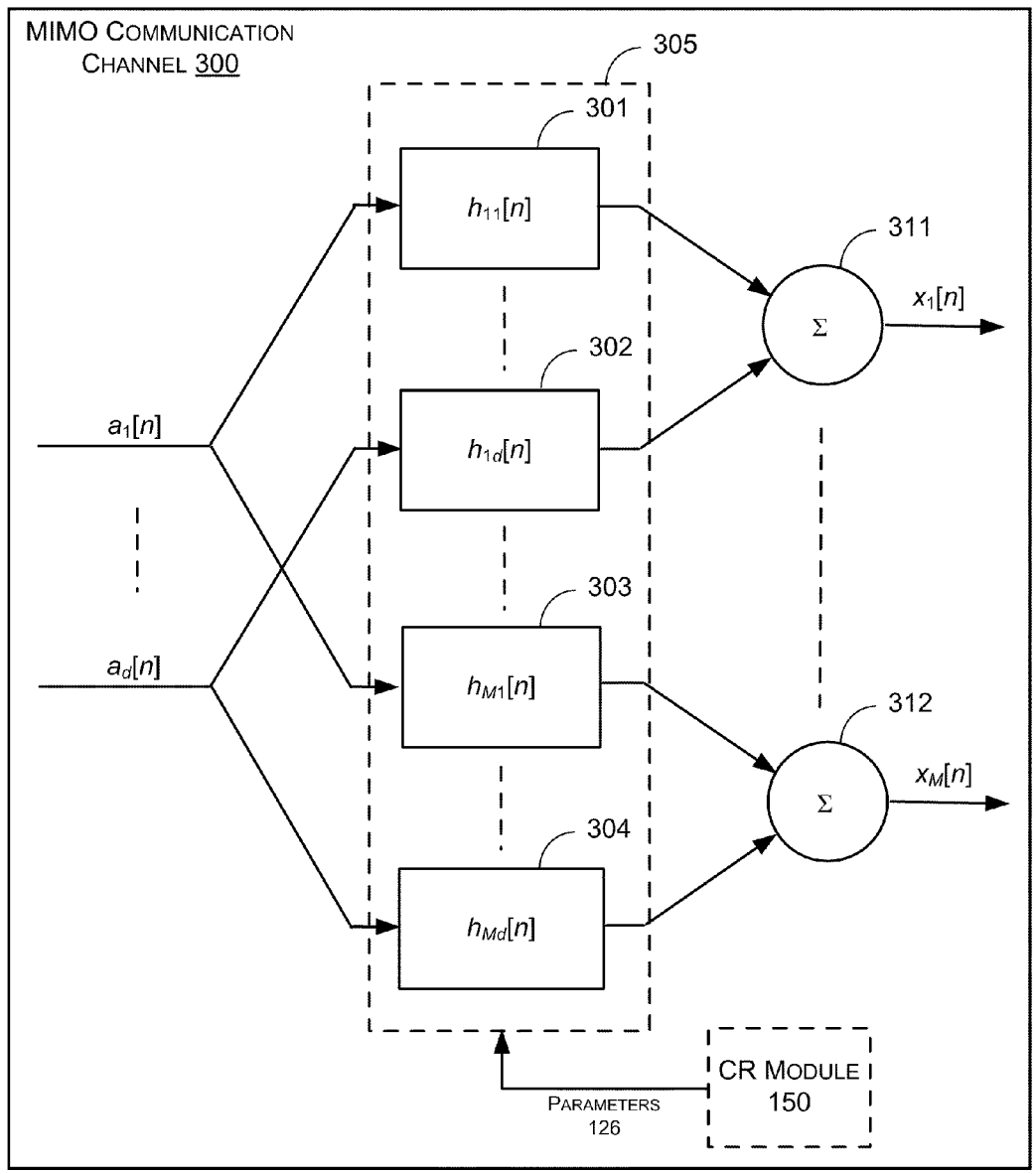
FIG. 3 is a block diagram for use in explaining an example mathematical model of a MIMO communication channel.

FIG. 3 is a block diagram for use in explaining an example mathematical model of a MIMO communication channel. MIMO communication channel 300 may comprise one or more blocks 305, the one or more blocks 305 comprising example blocks 301-304, each corresponding to a SISO channel as described below. Any of the one or more blocks 305 may be adjustable by a CR module 150 according to parameters 126 as described herein. MIMO communication channel 300 may further comprise summer components 311 and 312. The MIMO communication channel 300 of FIG. 3 illustrates the relationship between complex baseband transmitted signals and complex baseband received signals.

In FIG. 3, signals $a_1[n]$ are example complex baseband signal inputs to blocks 301 and 303, and signals $a_d[n]$ are example complex baseband signal inputs to blocks 302 and 304. Output signals from blocks 301 and 302 are coupled to summer component 311, while output signals from blocks 303 and 304 are coupled to summer component 312. The output signal of summer component 311 corresponds to signal $x_1[n]$, while the output signal from summer component 312 corresponds to signal $x_M[n]$. The vertical dotted lines between input signals $a_1[n]$ and $a_d[n]$, blocks 301 and 302, 302 and 303, 303 and 304, and summer components 311 and 312, respectively indicate additional like components. In FIG. 3, $a_1[n] \ldots a_d[n]$ are complex baseband transmitted signals, where d represents the number of transmitting antennas and $x_1[n] \ldots x_M[n]$ are complex baseband received signals, where M represents the number of receiving antennas.

In some embodiments, complex signals may be represented as vectors and/or matrices of real and complex signal components. Where signals are represented as vectors, input signals $a_1[n]$ through $a_d[n]$ may for example be represented as a first vector $a[n]$, while the output signals $x_1[n]$ through $x_M[n]$ may be represented as a second vector $x[n]$, where d is an integer that represents the number of inputs and M is an integer that represents the number of outputs in the MIMO system.

Each of the blocks 301, 302, 303 and 304 may have a respective impulse response function, represented by $h_{11}[n]$, $h_{1d}[n]$, $h_{M1}[n]$ and $h_{Md}[n]$, respectively. Each of the input signals from vector $a[n]$ may be applied to a corresponding set of impulse response functions, whose outputs may be summed together to generate one of the output signals from vector $x[n]$ via one of the summer components. In some embodiments, the impulse functions may thus each represent a portion of the Finite Impulse Response (FIR) as may be denoted by $h[n]$. The following vectors and matrices may represent the above discussed signal relationships:

Let $$x[n] = \begin{bmatrix} x_1[n] \\ \vdots \\ x_M[n] \end{bmatrix}, \quad a[n] = \begin{bmatrix} a_1[n] \\ \vdots \\ a_d[n] \end{bmatrix} \quad \text{Equation (1)}$$

and:

$$H[n] = \begin{bmatrix} h_{11}[n] & \cdots & h_{1d}[n] \\ \vdots & \vdots & \vdots \\ h_{M1}[n] & \cdots & h_{Md}[d] \end{bmatrix} \quad \text{Equation (2)}$$

The channel output $x[n]$ may be given by:

$$x[n] = H[n] * a[n] \quad \text{Equation (3)}$$

Equation (3) can be written in the Z-domain as:

$$x(z) = (z)a(z) \quad \text{Equation (4)}$$

where $x(z)$, $a(z)$ and $H(z)$ are Z-transforms of $x[n]$, $a[n]$ and $H[n]$ respectively.

Figure 4:
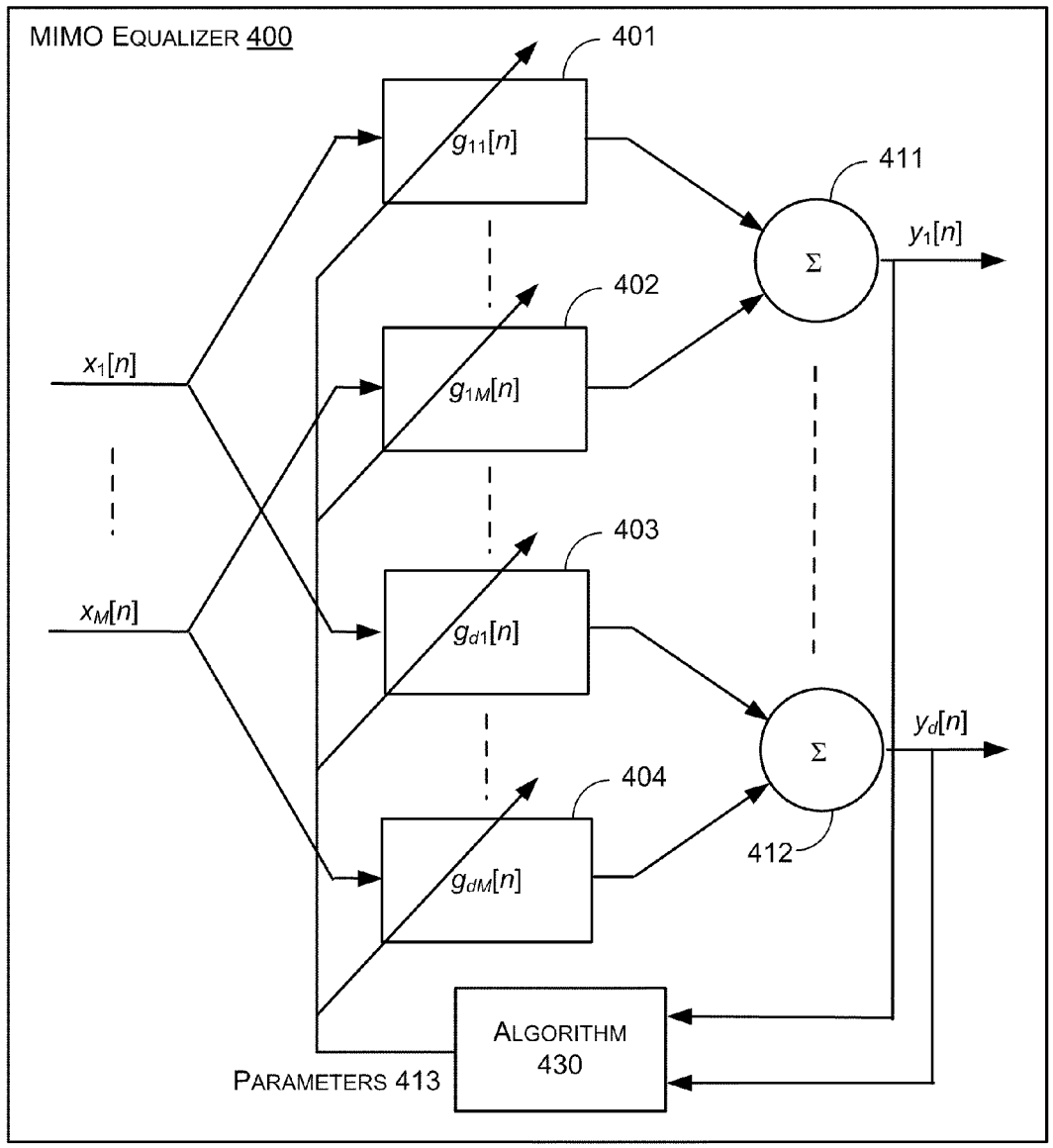
FIG. 4 is a block diagram of an example MIMO equalizer.

FIG. 4 is a block diagram of an example adaptive MIMO equalizer 400 that is arranged in accordance with at least some embodiments of the present disclosure. MIMO equalizer 400 may comprise blocks 401-404, each corresponding to a SISO FIR filter as described below, summer components 411 and 412, and algorithm 430. A MIMO equalizer 400 may be included in some embodiments of a CR device 100 as disclosed herein.

In FIG. 4, complex signals $x_1[n]$, each of which may be represented as a vector and/or a matrix of real and complex signal components as described above, may for example be inputs to blocks 401 and 403. Complex signals $x_M[n]$, each of which may be represented as a vector and/or a matrix of real and complex signal components as described above may for example be inputs to blocks 402 and 304. Output signals from blocks 401 and 402 may be coupled to summer component 411, while output signals from blocks 403 and 404 may be coupled to summer component 412. Output signals from summer component 411 correspond to $y_1[n]$, and output signals from summer component 412 correspond to $y_d[n]$. Output signals $y_1[n]$ and $y_d[n]$ may be also provided to algorithm 430, as shown. Algorithm 430 may be arranged to adjust one or more equalizer parameters 413 associated with blocks 401-404, as described below. The vertical dotted lines between input signals $x_1[n]$ and $x_M[n]$, blocks 401 and 402, 402 and 403, 403 and 404, and summer components 411 and 412, respectively, indicate additional like components as may be included in particular embodiments.

As shown in FIG. 4, blind equalizers may be used to recover an input sequence $a[n]$ from the output $x[n]$. For example, in some embodiments, equalizer 105 from FIG. 1 may for example be configured to perform blind MIMO equalization. To recover the input sequence, coefficients for an equalizer matrix $G[n]$ may be determined by the following identify property with relation to the FIR filter $H[n]$ associated with the various channels of the MIMO communication system:

$$G[n] * H[n] = I_d \quad \text{Equation (5)}$$

where $I_d$ is a d×d identity matrix and $G[n]$ is the equalizer matrix given by:

$$G[n] = \begin{bmatrix} g_{11}[n] & \cdots & g_{1M}[n] \\ \vdots & \vdots & \vdots \\ g_{d1}[n] & \cdots & g_{dM}[n] \end{bmatrix} \quad \text{Equation (6)}$$

In some embodiments in which only the statistics of input signals are known, a MIMO blind equalizer may be subjected to phase and permutation ambiguity. Therefore in some embodiments, a possible equalizer may be expressed as:

$$G(z)H(z) = PD(z),\quad\text{Equation (7)}$$

where P is the permutation matrix and D(z) is the diagonal matrix defined as:

$$D(z) = \text{diag}\{e^{j\theta_1}z^{-n_1}, \ldots, e^{j\theta_2}z^{-n_2}\},$$

where $\theta \in \{-\pi, \pi\}$. The equalizer which satisfies (7) may be referred to herein as the distortion-less recovery equalizer.

Figure 5:
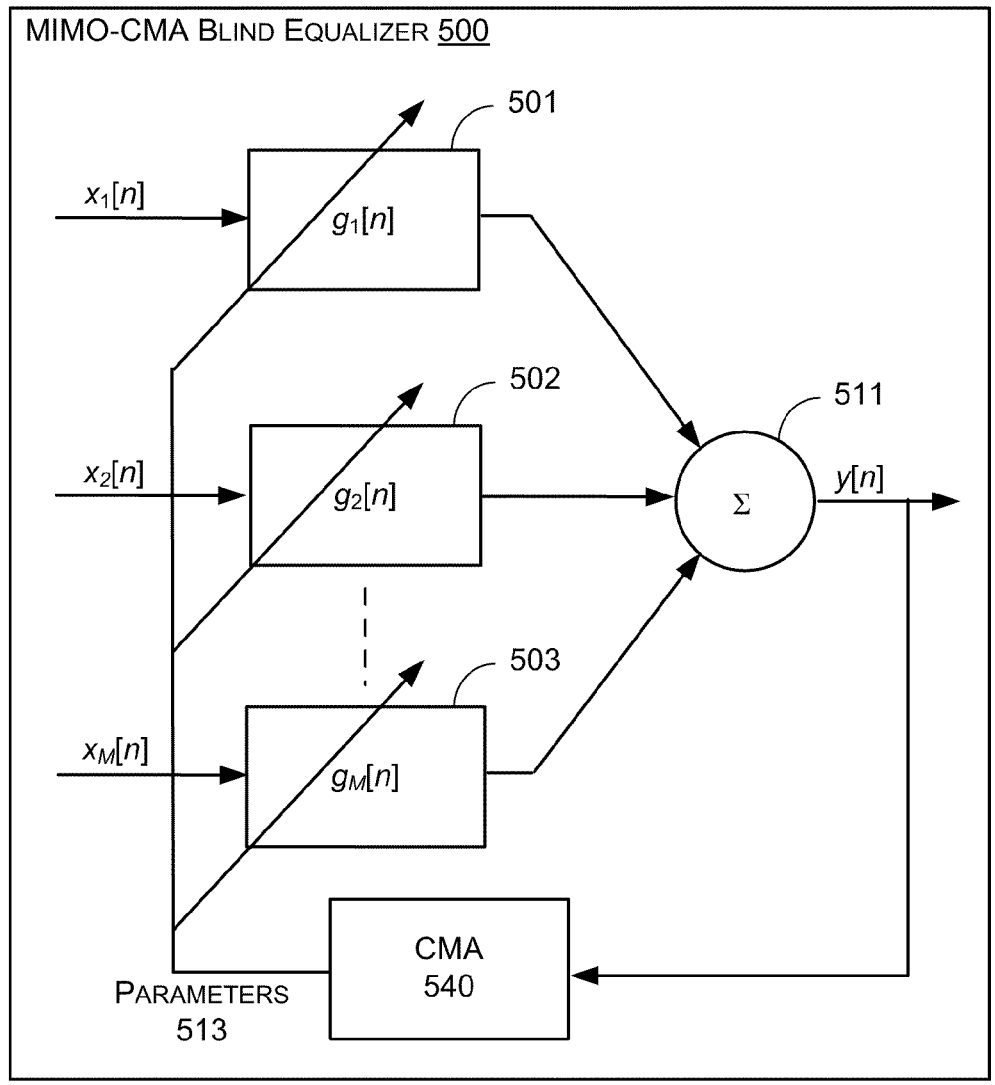
FIG. 5 is a block diagram of an example MIMO-CMA blind equalizer.

FIG. 5 is a block diagram of an example MIMO-CMA blind equalizer 500 that is arranged in accordance with at least some embodiments of the present disclosure. MIMO-CMA blind equalizer 500 may comprise blocks 501-503, each corresponding to a SISO FIR filter as described below, a summer component 511, and a CMA 540. A MIMO-CMA blind equalizer 500 may be included in some embodiments of a CR device 100 as disclosed herein.

In FIG. 5, complex input signals $x_1[n]$, $x_2[n]$, and $x_M[n]$, each of which may be represented as a vector and/or a matrix of real and complex signal components as described above, may for example be inputs to blocks 501, 502, and 503, respectively. Each of blocks 501-503 may be coupled to summer component 511. Output signals from summer component 511 correspond to y[n], which may for example be one of the output signals $y_1[n]$ through $y_d[n]$ as illustrated in FIG. 4. Output signals y[n] may be also provided to CMA 540, as shown. CMA 540 may adjust blocks 501-504, via equalizer parameters 513, as described below.

CMA for SISO systems may be configured for use in MIMO systems. A brief overview of MIMO CMA is presented here in connection with FIG. 5. In order to recover the input sequence from the output x[n], after each channel output, a linear filter may added. The coefficients of the linear filter may be adjusted to minimize a cost function C, such as may be represented as follows:

$$C(y[n]) = \frac{1}{4} E\{(|y(n)|^2 - r)^2\} \quad\text{Equation (8)}$$

where:

$$r = \frac{m_4}{m_2}$$

and E is an expectation operator for calculating statistical mean value, and:

$$m_2 = E\{|a_1[n]|^2\},\ m_4 = E\{|a_i[n]|^4\}\quad\text{Equation (9)}$$

Theorem: For a MIMO FIR channel of length L, if H(z) is irreducible with H[L−1] being of full rank, then any MIMO-CMA FIR blind equalizer with length K:

$$K \geq \left\lceil \frac{(L-1)d}{M-d} \right\rceil \quad\text{Equation (10)}$$

may achieve global convergence regardless of the initial setting.

The above theorem states that in some embodiments, a MIMO-CMA equalizer may be adapted to recover one of the input signals, remove ISI, and/or suppress CCI, regardless of the initial setting.

Turning now to a brief discussion of an AMC, such as AMC block 106 from FIG. 1, in some embodiments, AMC block 106 may for example be configured as a cyclostationarity based AMC.

With regard to cyclostationary spectral analysis generally, if the mean and autocorrelation of a process x(t) is periodic, then the process may be said to be a cyclostationary process, i.e. $M_x(t+T_0) = M_x(t)$ and $R_x(t+T_0, u+T_0) = R_x(t,u)$ for all t and u. Since the autocorrelation function $R_x(t, u)$ is periodic it may be expressed as a Fourier series as follows:

$$R_x\left(t+\frac{\tau}{2}, t-\frac{\tau}{2}\right) = \sum_\alpha R_x^\alpha(\tau)e^{j2\pi\alpha t} \quad\text{Equation (11)}$$

where:

$$R_x^\alpha(\tau) = \lim_{Z\to\infty} \int_{-Z/2}^{Z/2} R_x\left(t+\frac{\tau}{2}, t-\frac{\tau}{2}\right)e^{-j2\pi\alpha t}\,dt. \quad\text{Equation (12)}$$

The Weiner theorem for stationary processes may be extended to cyclostationary processes. The Spectral Correlation Function (SCF) S(f), where f is frequency, may be defined as a Fourier transform of (12):

$$S_x^\alpha = \int_{-\infty}^{\infty} R_x^\alpha(\tau)e^{-j2\pi f\tau}\,d\tau \quad\text{Equation (13)}$$

In practice there may be only a limited number of samples available and hence SCF may be estimated from these samples. A cyclic periodogram may be defined to estimate SCF from the limited sample set. In some embodiments, a cyclic periodogram may for example be defined as follows:

$$S_{xT}^\alpha(t, f) = \frac{1}{T} X_T\left(t, f+\frac{\alpha}{2}\right) X_T^*\left(t, f-\frac{\alpha}{2}\right), \quad\text{Equation (14)}$$

where $X_T(t,f)$ is the time invariant Fourier transform given by:

$$X_T(t, f) = \int_{t-T/2}^{t+T/2} x(u)e^{-j2\pi fu}\,du. \quad\text{Equation (15)}$$

The estimate of SCF can be obtained by the frequency smoothing of (14):

$$S_{xT}^\alpha(t, f)_{\Delta f} = \frac{1}{\Delta f} \int_{f-\Delta f/2}^{f+\Delta f/2} S_{xT}^\alpha(t, v)\,dv. \quad\text{Equation (16)}$$

SCF can be obtained by increasing the observation length T and decreasing $\Delta f$, that is:

$$S_x^\alpha(f) = \lim_{\Delta f \to 0} \lim_{T\to\infty} S_{xT}^\alpha(t, f)_T. \quad\text{Equation (17)}$$

With regard to Spectral Coherence (SC) and α profile, SCF may be a correlation of frequency components shifted by f−α/2 and f+α/2. Spectral Coherence (SC) may be defined as:

$$C_x^\alpha = \frac{S_x^\alpha(f)}{[S(f+\frac{\alpha}{2})S(f-\frac{\alpha}{2})]^{\frac{1}{2}}}.$$ Equation (18)

The magnitude of SC may be between 0 and 1. In order to reduce the computational complexity, some embodiments may use a Cyclic Domain Profile (CDP) or α-profile which may be defined as:

$$I(\alpha) = \max_f |C_x^\alpha(f)|.$$ Equation (19)

With regard to the configuration of a cyclostationarity based AMC, most modulated signals exhibit second order cyclostationarity. From the Cyclic Domain Profile (CDP) of a signal, important information about the signal such as modulation type, keying rate, pulse shape, and carrier frequency can be obtained.

Figure 6:
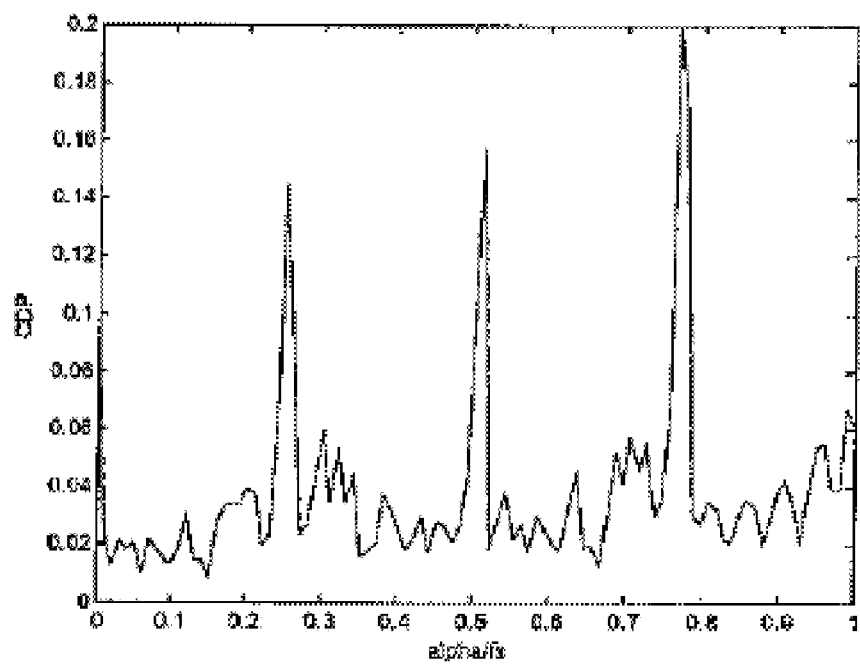
FIG. 6 is a plot showing an example Cyclic Domain Profile (CDP) function for BPSK.
Figure 7:
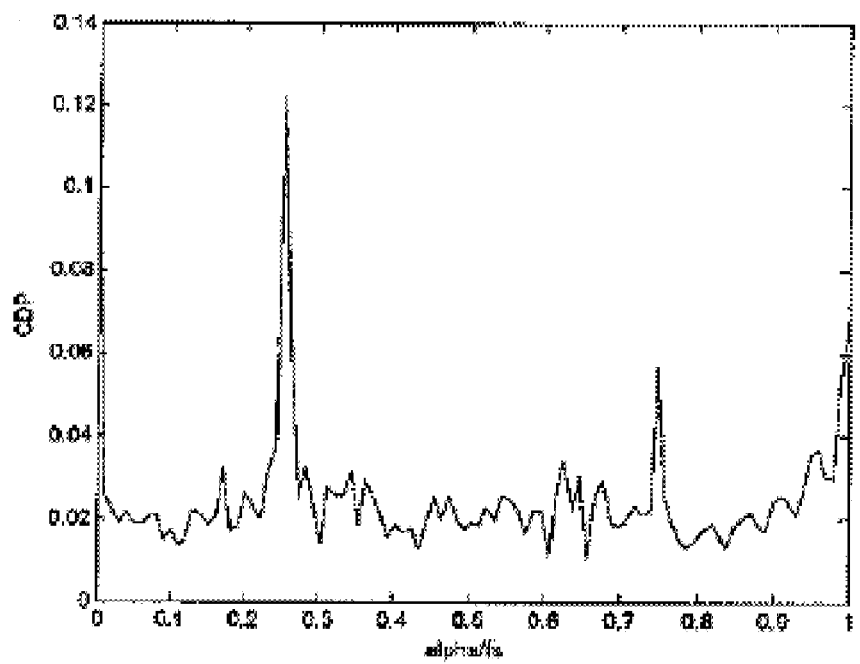
FIG. 7 is a plot showing an example Cyclic Domain Profile (CDP) function for QPSK.

FIG. 6 and FIG. 7 are plots showing the CDP function for Binary Phase Shift Keying (BPSK) and Quadrature Phase Shift Keying (QPSK) respectively. To generate the plots illustrated in FIG. 6 and FIG. 7, a Square Root Raised Cosine (SQRC) pulse with a roll off factor of 0.32 was used. Time domain and frequency domain smoothing may be performed in order to estimate the SC. For time averaging the following equation may be used:

$$S_{xT}^\alpha = \frac{1}{n}\sum_{k=1}^N S_{xT}^\alpha(t_k, f).$$ Equation (20)

For the above calculation, example values of N=20 and T=128 may be used, providing a total of N×T=1560 samples.

Figure 8:
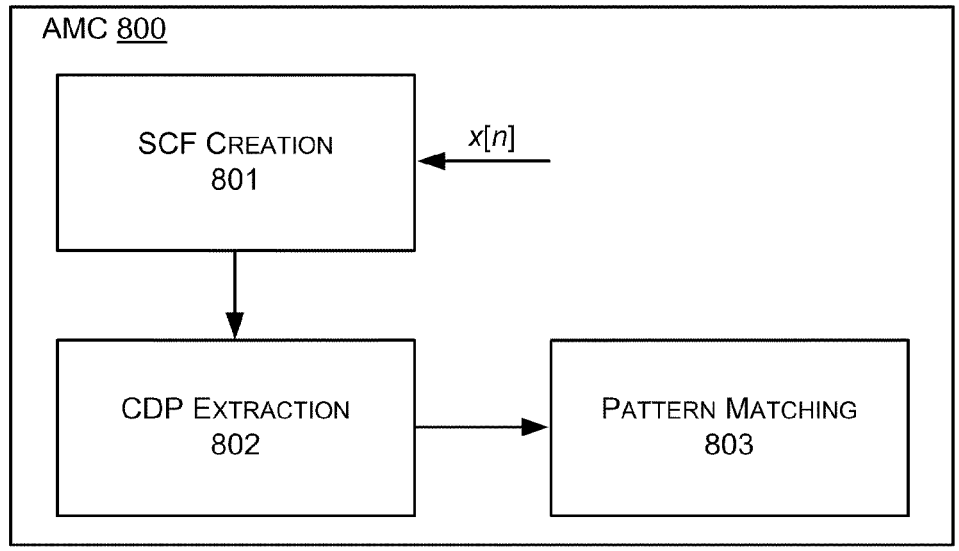
FIG. 8 is a block diagram of an example cyclostationarity based AMC.

FIG. 8 is a block diagram of an example cyclostationarity based AMC 800 adapted in accordance with at least some embodiments of the present disclosure. AMC 800 may comprise an SCF creation component 801, a CDP extraction component 802, and a pattern matching component 803. In FIG. 8, input x[n] is processed as an input of the SCF creation component 801, which is arranged to generate a first output in response to input x[n]. The first output that is received and processed by CDP extraction component 802, which is arranged to generate a second output in response to the first output. The second output is received and processed by the pattern matching component 803. An AMC 800 may be included in some embodiments of a CR device 100 as disclosed herein.

SCF creation and CDP extraction were discussed in the previous section. The final stage of the AMC 800 may be to classify the α-profile using pattern matching 803. Pattern matching 803 may be performed using a feed forward neural network, for example. In some embodiments, a MAXNET type of neural network structure illustrated in FIG. 9 may be used.

Figure 9:
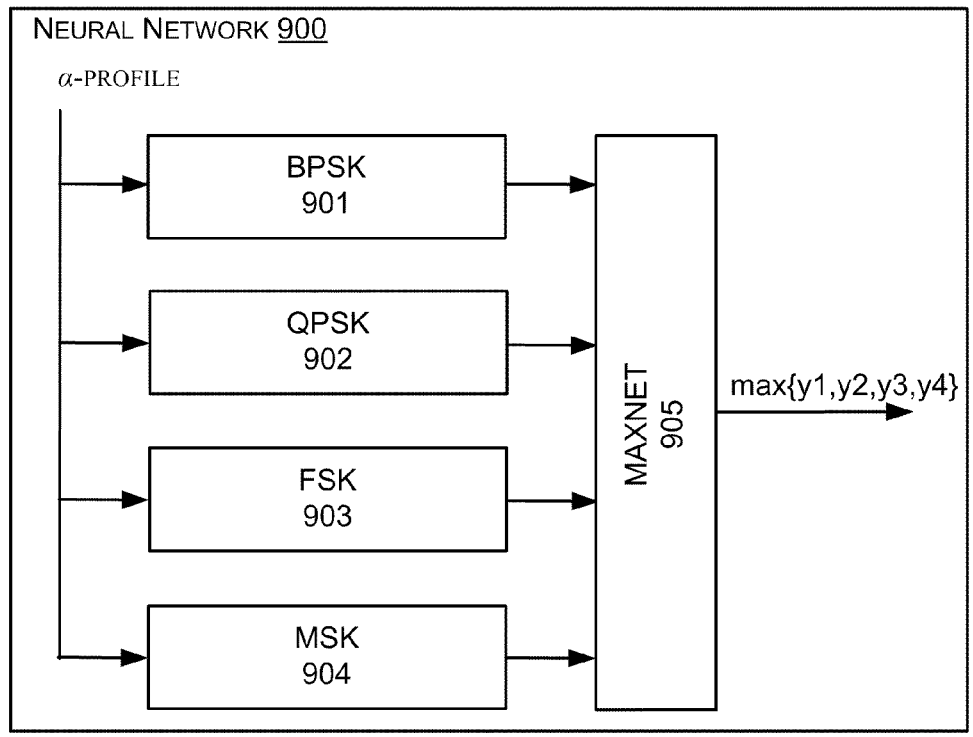
FIG. 9 is a block diagram of an example neural network structure.

FIG. 9 is a block diagram of an example neural network structure 900 that is adapted in accordance with at least some embodiments of the present disclosure. Neural network 900 may comprise BPSK component 901, QPSK component 902, Frequency Shift Keying (FSK) component 903, Minimum Shift Keying (MSK) component 904, and/or MAXNET component 905. α-profile signals may be input to each of components 901-904, each of which is adapted to provides an output, responsive to their respective inputs, to MAXNET 905. MAXNET 905 in turn may be arranged to provide an output of max {y1, y2, y3, y4} as described below. A neural network 900 may be included in some embodiments of a CR device 100 as disclosed herein.

In FIG. 9, a MAXNET structure 905 may be used in which each feed forward network has two hidden layers with five neurons in each layer, and an activation function used may for example be tan h(x). The network may be trained using a back propagation algorithm with an initial learning rate of η=0.05 and a momentum constant of α=0.7. The input to the feed forward network may be the 200 point α-profile, and the output may for example vary between [−1, 1]. The function of the MAXNET structure is to choose a highest relative value among all the feed forward networks.

In some embodiments, an equalizer 105 and AMC 106 from FIG. 1 may arranged in cooperation to perform channel and modulation detection in a CR device 100, as described herein.

Figure 10:
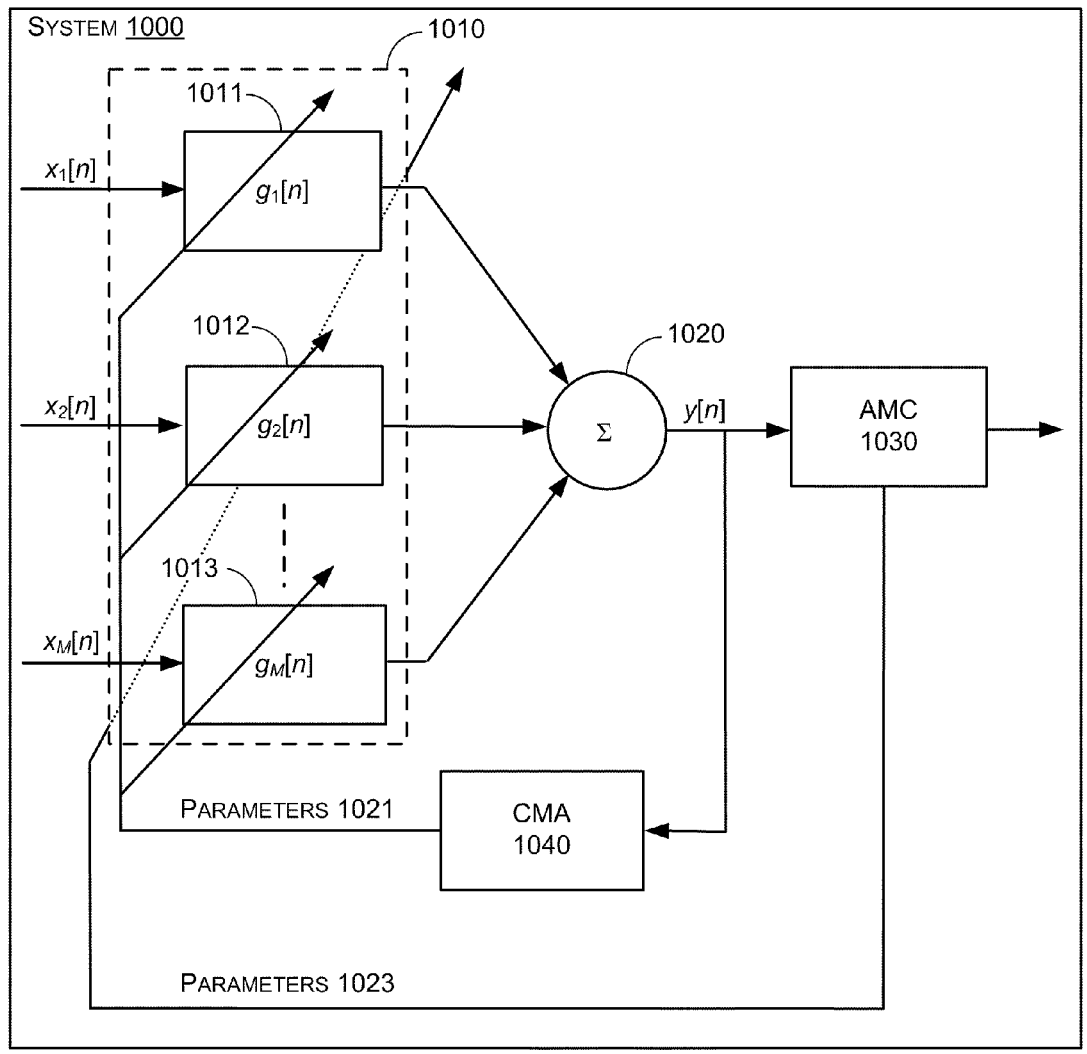
FIG. 10 is a block diagram of a system comprising a cooperating equalizer and AMC.

FIG. 10 is a block diagram of a system 1000 comprising a cooperating equalizer and AMC, arranged in accordance with at least some embodiments of the present disclosure. System 1000 may comprise an equalizer block 1010 which in turn may comprise equalizers 1011, 1012, and/or 1013. System 1000 further comprises summer component 1020, AMC block 1030, and CMA block 1040. System 1000 may be included in some embodiments of a CR device 100 as disclosed herein.

In FIG. 10, complex equalizer input signals $x_1[n]$, $x_2[n]$, and $x_M[n]$, each of which may be represented as a vector and/or a matrix of real and complex signal components as described above, may for example be inputs to equalizers 1011, 1012, and 1013, respectively. Outputs of each of equalizers 1011-1013 may be referred to herein as equalizer output signals. Equalizer output signals may be coupled to one or more summer components such as 1020. Output signals from summer component 1020 may be referred to herein as summer output signals. Summer output signals may correspond to y[n] (again, y[n] may for example be one of the output signals $y_1[n]$ through $y_d[n]$ as illustrated in FIG. 4). Summer output signals y[n] may be generated by summer component 1020 in response to receiving the equalizer outputs from equalizer block 1010. Summer output signals y[n] may be provided to AMC block 1030. Summer output signals y[n] may be also provided to CMA block 1040, as shown. CMA block 1040 may be arranged to adjust equalizer parameters 1021 for one or more of equalizers 1011-1013, as described below. Furthermore, AMC block 1030 may also adjust equalizer parameters 1023 for equalizer block 1010, as described below.

In FIG. 10, parameters of the equalizer 1010 may be adjusted based on the evaluated performance of the AMC 1030. For example, in some embodiments, a length (K) or order associated with the equalizer 1010 may be adjusted based on a performance criteria associated with the AMC 1030.

In general, all fading channels may be modeled as time varying FIR filters and hence the length of an equalizer 1010, i.e., K, may play an important role. When a receiver has no information about the channel, choosing the length of the equalizer (K) may be difficult. In some embodiments, the value of K may be selected based on the probability of classification of the AMC 1030. For example, the value of K is increased if the probability of correct classification for the AMC is poor.

Figure 11:
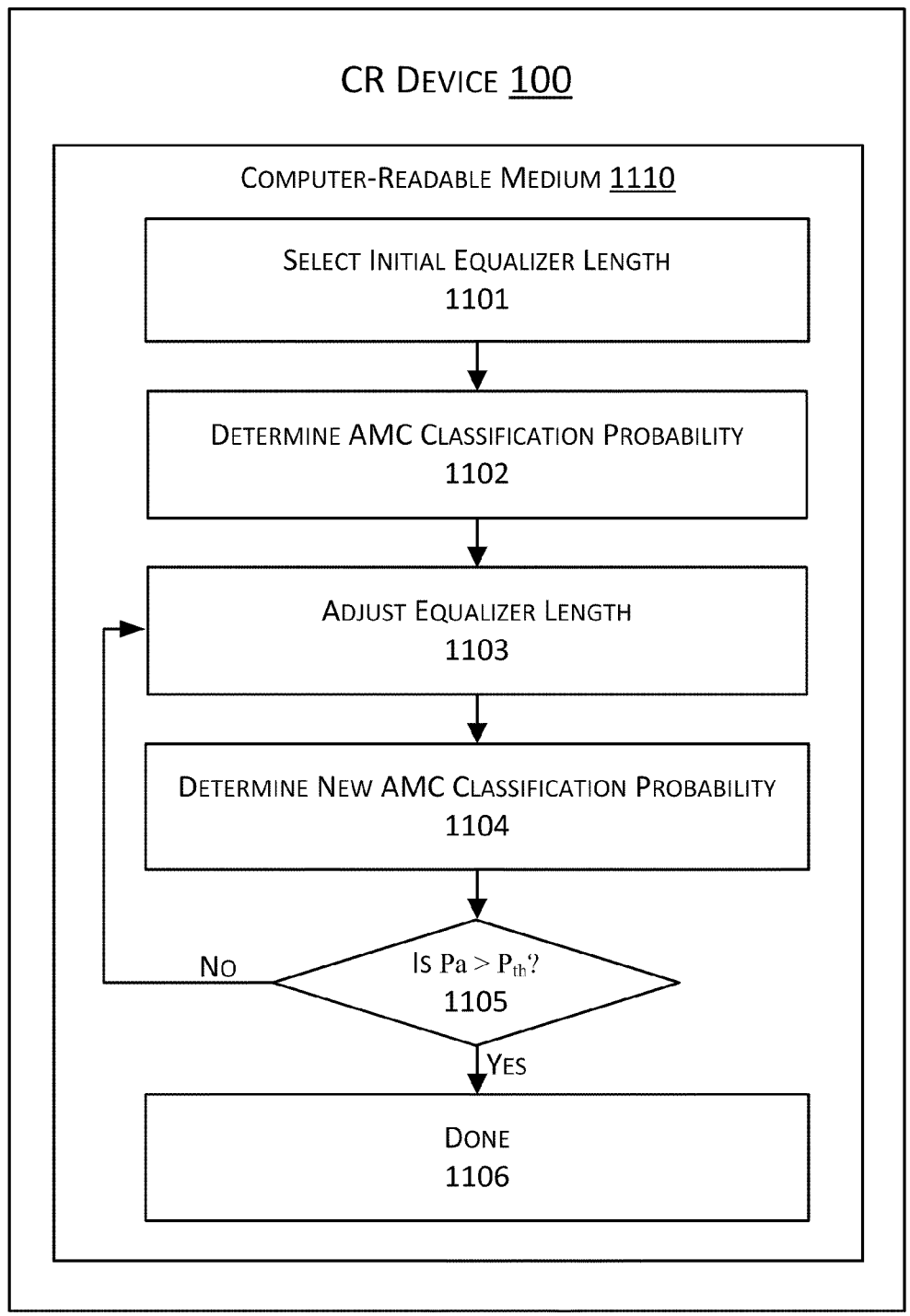
FIG. 11 is a flow diagram of an example algorithm for choosing an equalizer parameter based on performance of an AMC.

FIG. 11 is a flow diagram of an example algorithm for choosing an equalizer parameter based on the evaluated performance of an AMC that is arranged in accordance with at least some embodiments of the present disclosure. The example flow diagram may include one or more functions, operations/modules, or actions as illustrated by blocks 1101-1106, which may be performed in a method or process of CR device 100, and/or instructions as may be recorded on a computer readable medium 1110. The example methods or processes illustrated may include one or more of "Select Initial Equalizer Length" at block 1101, "Determine AMC Classification Probability" at block 1102, "Adjust Equalizer Length" at block 1103, "Determine New AMC Classification Probability" at block 1104, "Is $P_a > P_{th}$?" at block 1105, and/or "Done" at block 1106.

In FIG. 11, blocks 1101-1106 are illustrated as being performed sequentially, with block 1101 first and block 1106 last. It will be appreciated however that these blocks may be re-ordered as convenient to suit particular embodiments. It will also be appreciated that in some examples various blocks may be eliminated and/or combined with other blocks.

In FIG. 11, the example algorithm may include choosing a length (K) of an equalizer based on the evaluated performance of an AMC. In block 1101, "Select Initial Equalizer Length" a small initial length may be selected for the equalizer, for example, K=2. Block 1101 may be followed by block 1102. In block 1102, "Determine AMC Classification Probability", the probability of classification for the AMC ($P_a$) may be calculated. Block 1102 may be followed by block 1103. In block 1103, "Adjust Equalizer Length", a number of taps in an equalizer may be modified. When the probability $P_a$ is below a threshold probability $P_{th}$, for example, a number of taps in an equalizer may be increased. A number of taps in an equalizer may also be decreased in some embodiments, for example, if the initial classification probability is very much greater than the threshold, then the equalizer length may be reduced so that the number of computations required to perform equalization can be reduced. Block 1103 may be followed by block 1104. In block 1104, "Determine New AMC Classification Probability", probability $P_a$ may again be calculated. Block 1104 may be followed by block 1105. In block 1105, "Is $P_a > P_{th}$?", probability $P_a$ may again be compared to probability $P_{th}$ to determine if probability $P_a$ exceeds threshold probability $P_{th}$. If the threshold probability is exceeded then the algorithm may proceed from block 1105 to block 1106. If the threshold probability is not exceeded then the algorithm may proceed from block 1105 to block 1103. In block 1106 "Done", the algorithm can stop and output any determined equalizer parameters.

Figure 12:
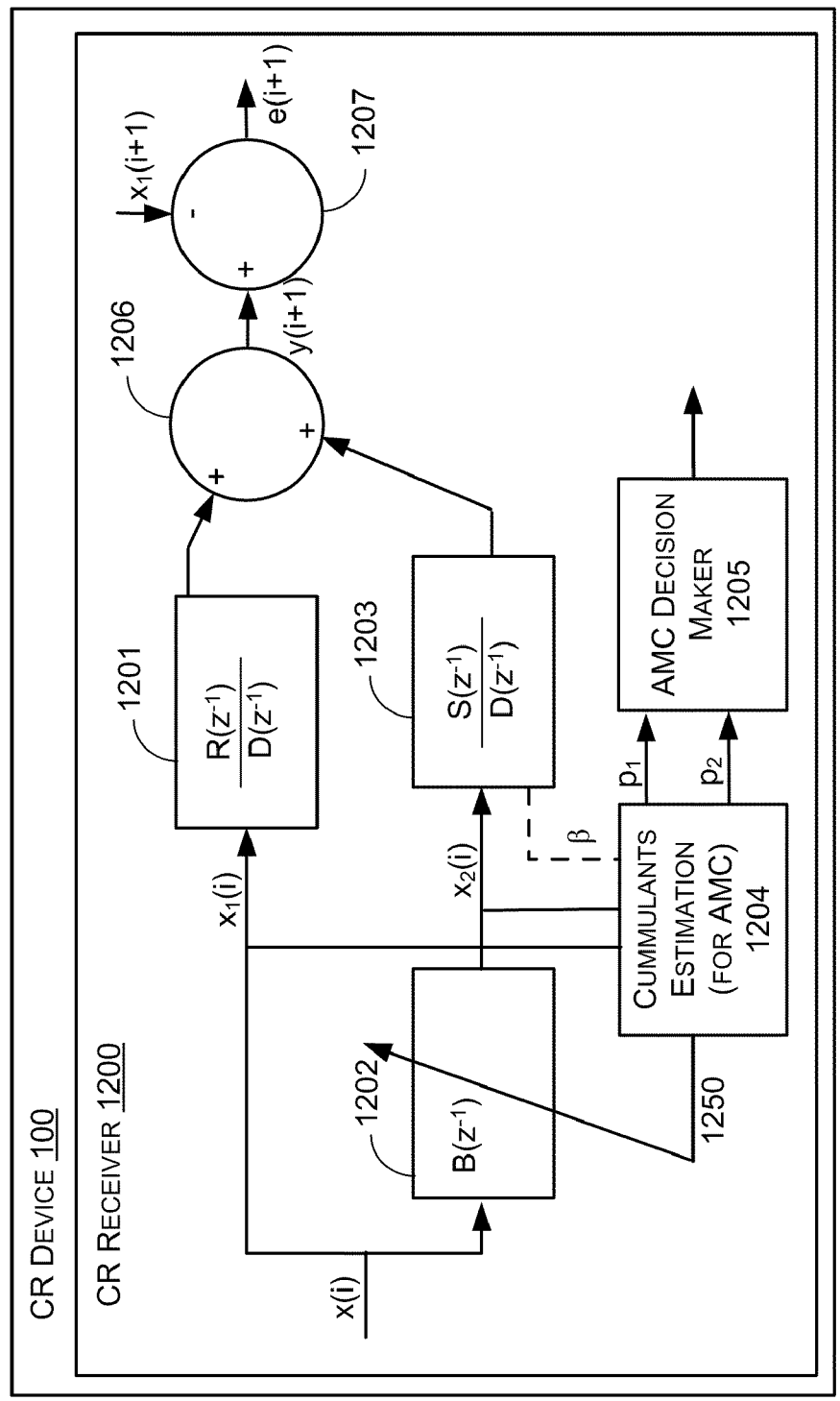
FIG. 12 is a block diagram of an example CR device comprising a CR receiver; all arranged in accordance with at least some embodiments of the present disclosure.
Figure 2:
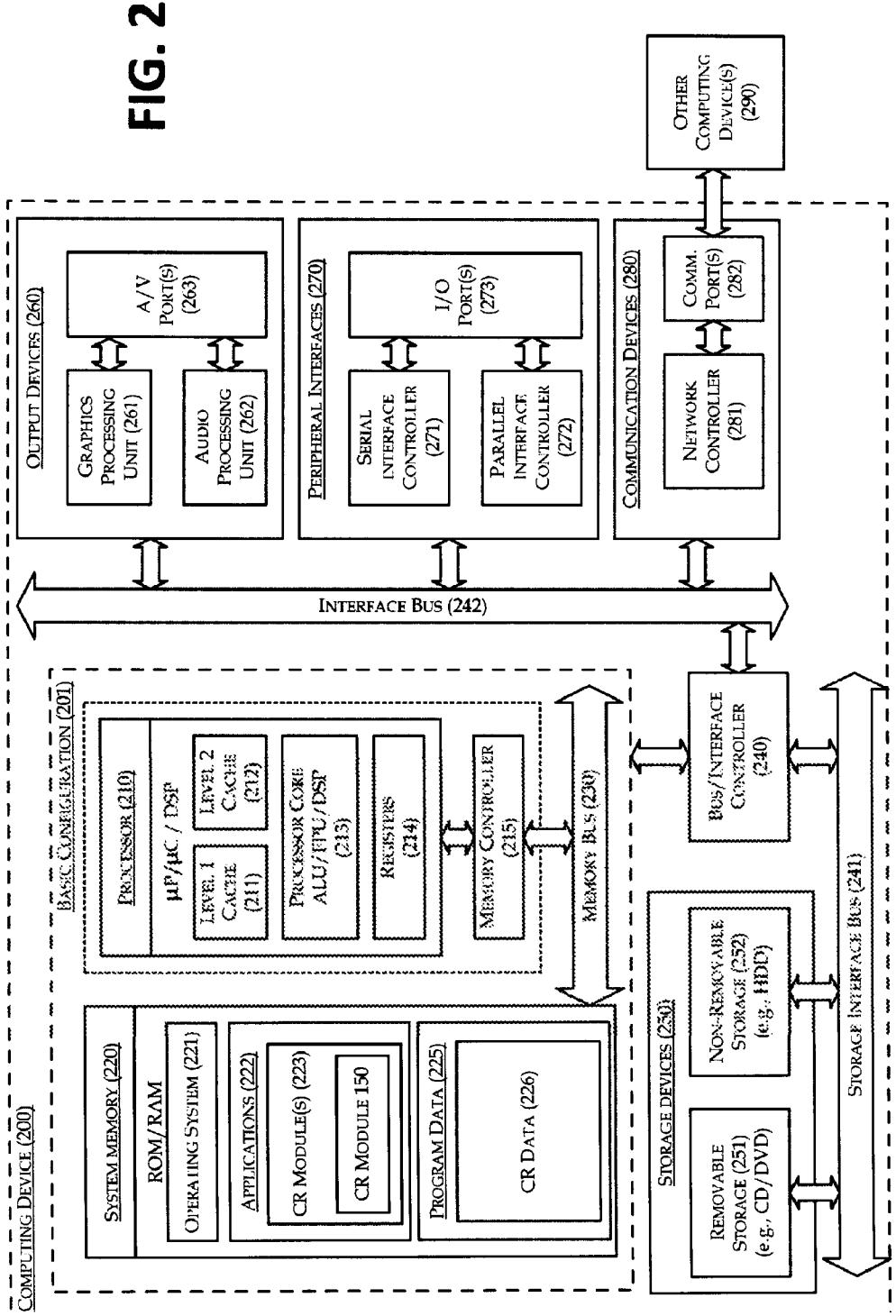
Figure 11:
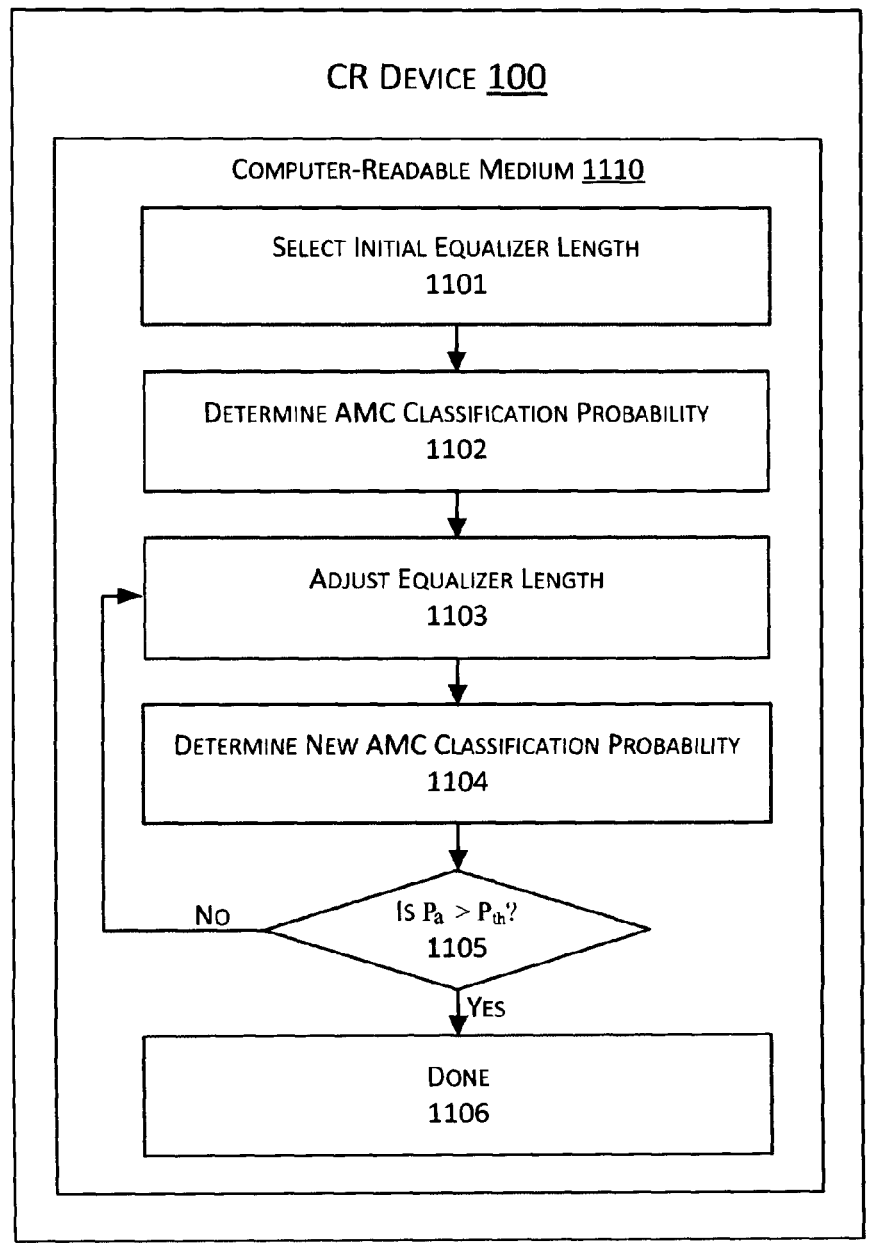

FIG. 12 is a block diagram of an example CR device 100 comprising a CR receiver 1200, arranged in accordance with at least some embodiments of the present disclosure. CR receiver 1200 may comprise blocks 1201-1205 as well as components 1206 and 1207, the functions of which are described below. In connection with FIG. 12, an AMC based on fourth order cumulants may be considered, but it should be emphasized that the disclosed technologies can be generalized to any feature based AMC. Furthermore, it should be emphasized that any or all of the blocks and components in FIG. 12 may be reduced to a series of equations that are synthesized together into a single transfer function in some embodiments. The blocks and components in FIG. 12 may be implemented in software or hardware or any combination thereof.

In FIG. 12, a signal x(i) may be input to block 1202 and block 1201. Signal x(i) is designated $x_1(i)$ as it enters block 1201. Signal $x_1(i)$ may also be provided to block 1204, for cumulants estimation for AMC. Block 1204 may be arranged to adjust block 1202. The output of block 1202 is designated $x_2(i)$, and may be provided to blocks 1203 and 1204. Block 1204 may also be configured to provide outputs $p_1$ and $p_2$ to AMC Decision Maker block 1205. Block 1204 may also be configured to provide β to block 1203. Meanwhile, blocks 1201 and 1203 may be configured to provide output to component 1206. Component 1206 may be configured to provide an output y(i+1) as an input to component 1207. Component 1207 may be configured to receive the output y(i+1) as well as $x_1(i+1)$ as inputs. Component 1207 may be configured to generate an output e(i+1) from y(i+1) and $x_1(i+1)$.

In FIG. 12, x(i) may comprise a received complex baseband signal which may be subjected to multipath fading. The block 1202 may contain an adaptive FIR filter whose impulse response in z domain is denoted by the polynomial $B(z^{-1})$. The coefficients of $B(z^{-1})$ may be adjusted, e.g., by block 1202, block 1204, or any other appropriately configured hardware and/or software, based on the cost function related to the performance of AMC as described herein.

The block 1204 may be configured to compute cumulant values of the signals $x_1(i)$ and $x_2(i)$. The cumulant values may be referred to as $p_1$ and $p_2$. The block 1204 may also be configured to evaluate the cost function related to the performance of the AMC, thereby generating an evaluation output 1250 that may be used for adapting block 1202 as discussed above. The block 1205 may be configured to make a final decision about the modulation scheme by fusing the values of $p_1$ and $p_2$.

The blocks 1201 and 1203 are referred to herein as predictor blocks. Predictor blocks 1201 and 1203 may be configured to contain filters constructed using adaptive polynomials, e.g., $R(z^{-1})$, $D(z^{-1})$ and $S(z^{-1})$. The polynomials $R(z^{-1})$, $D(z^{-1})$ and $S(z^{-1})$ are referred to herein as predictor polynomials. Predictor polynomials $R(z^{-1})$, $D(z^{-1})$ and $S(z^{-1})$ may be adapted in such a way that the symbol detection performance of the receiver 1200 is improved.

The signal y(i+1) may comprise a summation of the output signals from block 1201 and 1203, wherein the summing operation may be performed by the component 1206. The component 1207 may be configured to subtract the signal y(i+1) from a copy of input signal $x_1(i+1)$ and may be configured to output the signal e(i+1). The output signal e(i+1) may be used for symbol detection by the receiver 1200, CR device 100, or any other device.

Referring to FIG. 12, automatic modulation classification may improve the spectral efficiency of cognitive radios by speeding up detection of modulation schemes used for RF communications in the environment surrounding a cognitive radio. Multipath fading channels may affect the performance of CR receivers by causing Inter Symbol Interference (ISI). Multipath channels may affect not only symbol detection but may also affect the performance of AMC components.

FIG. 12 describes a novel receiver structure which may improve the performance of an AMC. The improvement in performance is at least in part due to the fusion of two cumulant values for decision making. In some embodiments, these two cumulant values may be available due to the inherent nature of a receiver structure which branches out a received signal x(i) into two different processing blocks. Also the proposed receiver may improve symbol detection apart from improving the performance of AMC. This concept can furthermore be extended to other AMC algorithms by selecting a cost function which is related to the performance of the chosen AMC.

Operations that may be performed in a system such as FIG. 12 include, for example, adapting the polynomials and fusion of cumulants values. Adapting the polynomials refers to updating the coefficients of the polynomials recursively so that the respective cost functions attain minimum value. Recursive algorithms such as "steepest descend" algorithms and "recursive least square" algorithms can be used to recursively update the polynomials. Fusing the cumulant values refers to combing the cumulant values using some function or fusion rule.

With regard to adapting the polynomials, the overall block diagram of a CR receiver 1200 is shown in FIG. 12. In the CR receiver 1200, the received signal given by x(i) may be subjected to multipath fading, for example:

$$x(i)=H(z^{-1})w(i) \quad \text{Equation (21)}$$

where w(i) is the transmitted sequence and $H(z^{-1})$ is a FIR transfer function of the multipath channel. Also from FIG. 12 it may be seen that:

$$x_1(i)=x(i) \text{ and } x_2(i)=B(z^{-1})x(i) \quad \text{Equation (22)}$$

From FIG. 12 it can be seen that the receiver has four polynomials $B(z^{-1})$, $D(z^{-1})$, $S(z^{-1})$ and $R(z^{-1})$. All these polynomials may be adapted recursively and hence track time varying channels. The polynomial $B(z^{-1})$ may be adapted such that the performance of the AMC may be improved. For a cumulants based AMC, $B(z^{-1})$ may be adapted by minimizing the following example cost function:

$$J_1 = -|C_{40}x_2(i)| \quad \text{Equation (23)}$$

where $C_{40}x_2(i)$ is the fourth order cumulants of the signal $x_2(i)$. The above cost function may approximately maximize the cumulants value of the received signal and thus may improve the AMC performance. Any gradient based search technique may be used to recursively adapt $B^{(z-1)}$.

The other polynomials $D(z^{-1})$, $S(z^{-1})$ and $R(z^{-1})$ may be adapted such that the symbol detection may be improved, hence the following cost function may be minimized for adapting these polynomials:

$$J_2 = E(|x_1(i+1)-y(i+1)|^2) \quad \text{Equation (24)}$$

where E(x,y) is the expectation operator. The above cost function may be described as the one step ahead prediction error. It can be shown that the above cost function may achieve its minimum when:

$$D(z^{-1})=H(z^{-1}), \quad \text{Equation (25)}$$

and:

$$R(z^{-1})+S(z^{-1})D(z^{-1})=z(H(z^{-1})-1) \quad \text{Equation (26)}$$

From equation (25) it can be seen that the channel impulse response may be estimated apart from achieving better symbol detection. This may allow the use of estimated channel information to improve the performance of the AMC. Any Recursive Least Squares algorithm may be used for adapting these polynomials.

With regard to fusion of cumulants values, as mentioned in the previous section, the performance of an AMC may be improved due to the fusion of cumulants values. The structure of the proposed CR receiver 1200 may offer this diversity. The following two cumulants may be fused to make the final decision:

$$P_1 = |C_{40}x_2| \quad \text{Equation (27)}$$

$$P_2 = \frac{1}{\beta}|C_{40}x_1| \quad \text{Equation (28)}$$

where $C_{40}x_2$ and $C_{40}x_1$ are cumulants values of $x_2$ and $x_1$ respectively. In (28) the value of β may be calculated using the estimated channel information (refer to equation 25) and may be given by:

$$\beta = \frac{\sum_{l=1}^{L}|d_l|^4}{\left\{\sum_{l=1}^{L}|d_l|^2\right\}^2} \quad \text{Equaiton (29)}$$

where $d_1$ are the coefficients of $D(z^{-1})$. The effect of the multipath channel may be to drive the cumulant values of the received signal to zero. Therefore the following example fusion rule may be used for fusing the two cumulant values offered by FIG. 12:

$$P_f = \max(P_1, P_2) \quad \text{Equation (30)}$$

where $P_f$ is the final fused value of cumulants that is used for decision making There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A Cognitive Radio (CR) device configured to process baseband signals, comprising:
  a processor;
  an equalizer configured to receive baseband signals and generate equalized signals according to one or more equalizer parameters;
  an Automatic Modulation Classification (AMC) component that is coupled to the equalizer and is configured to receive the equalized signals and to determine a modulation scheme associated with the equalized signals; and
  a CR module executable by the processor and coupled to the AMC component and adapted to evaluate performance of the AMC component and adjust at least one of the one or more equalizer parameters based on the performance of the AMC component.

2. The CR device of claim 1, wherein the CR module is configured to calculate a cost function based on performance of the AMC component and adjust at least one of the one or more equalizer parameters based on the cost function.

3. The CR device of claim 2, wherein the CR module is configured to minimize the cost function to adjust at least one of the one or more equalizer parameters based on an evaluated performance criteria of the AMC component.

4. The CR device of claim 1, wherein the CR module is configured to adjust a length of the equalizer based on an evaluated performance criteria of the AMC component.

5. The CR device of claim 1, wherein the equalizer comprises a blind equalizer.

6. The CR device of claim 1, wherein the equalizer comprises a Multi-Input Multi-Output Constant Modulus Algorithm (MIMO-CMA) blind equalizer.

7. The CR device of claim 1, wherein the CR module is configured to apply a recursive algorithm to estimate polynomials associated with the equalizer.

8. The CR device of claim 1, wherein the AMC comprises a cyclostationarity based AMC.

9. The CR device of claim 8, wherein the AMC is configured to utilize a pattern matching component.

10. The CR device of claim 9, wherein the pattern matching component comprises a neural network structure for improving performance of the AMC.

11. The CR device of claim 10, wherein the neural network structure comprises one or more of a Binary Phase Shift Keying (BPSK) component, a Quadrature Phase Shift Keying (QPSK) component, a Frequency Shift Keying (FSK) component, a Minimum Shift Keying (MSK) component, and/or a MAXNET component.

12. The CR device of claim 8, wherein the AMC includes one or more of a Spectral Correlation Function (SCF) creation component and/or a Cyclic Domain Profile (CDP) extraction component.

13. A method for classifying a modulation scheme associated with a received signal in a Cognitive Radio (CR) device, the method comprising:
    initializing an equalizer length associated with an equalizer in the CR device to an initial length;
    generating an equalized signal with the equalizer in response to the received signal;
    determining an initial Automatic Modulation Classification (AMC) classification probability associated with the received signal in response to the equalized signal;
    comparing the initial AMC classification probability to a threshold probability to determine when the initial AMC classification probability is less than the threshold probability; and
    adjusting the equalizer length by increasing or decreasing the equalize length in response to the initial AMC classification probability.

14. The method of claim 13, further comprising:
    determining a subsequent AMC classification probability associated with a subsequently received signal in the CR device; and
    comparing the subsequent AMC classification probability to the threshold probability; and
    adjusting the equalizer length based on the comparison of the subsequent AMC classification probability to the threshold probability.

15. A method for adjusting equalizer parameters in a Cognitive Radio (CR) device, comprising:
    receiving one or more baseband signals in the CR device;
    processing the one or more baseband signals by one or more equalizers in an equalizer block of the CR device, thereby producing one or more equalized signals, wherein the equalizer block is configured according to one or more equalizer parameters;
    summing the equalized signals to produce one or more summer output signals;
    receiving the one or inure summer output signals in one or more of an Automatic Modulation Classification (AMC) component and a Constant Modulus Algorithm (CMA) component; and
    adjusting at least one of the one or more equalizer parameters by one or more of the AMC and CMA components.

16. The method of claim 15, further comprising calculating a cost function based on performance of the AMC component and adjusting at least one of the one or more equalizer parameters based on a cost function output.

17. The method of claim 15, further comprising adjusting a length of the equalizer block based on performance of the AMC component.

18. The method of claim 15, wherein the equalizer block comprises a blind equalizer.

19. The method of claim 15, wherein the AMC comprises a cyclostationarity based AMC.

20. The method of claim 15, wherein the AMC includes one or more of a pattern matching component, a Spectral Correlation Function (SCF) creation component, and/or a Cyclic Domain Profile (CDP) extraction component.

21. A method for adapting to a modulation scheme associated with a received input signal in a Cognitive Radio (CR) device, comprising:
    receiving an input signal in the CR device;
    processing the input signal in an adaptive Finite Impulse Response (FIR) filter to produce a FIR filter Output signal;
    classifying a modulation scheme associated with the input signal by evaluating the FIR filter output signal with an Automatic Modulation Classification (AMC) component;
    determining one or more FIR filter parameters by evaluating a cost function associated with performance of the AMC component; and
    adapting the FIR filter according to the one or more FIR filter parameters.

22. The method of claim 21, further comprising:
    determining cumulant values of the input signal and the FIR filter output signal; and
    fusing determined cumulant values of the input signal and the FIR filter output signal to make a final modulation scheme determination.

23. The method of claim 21, further comprising determining a polynomial value that is used by the adaptive FIR filter.

24. The method of claim 21, further comprising determining a polynomial value that is used by a filter applied to one or more of the input signal and the FIR filter output signal.

* * * * *

UNITED STATES PATENT AND TRADEMARK OFFICE
CERTIFICATE OF CORRECTION

PATENT NO. : 8,295,341 B2
APPLICATION NO. : 12/609011
DATED : October 23, 2012
INVENTOR(S) : Bose et al.

It is certified that error appears in the above-identified patent and that said Letters Patent is hereby corrected as shown below:

On the Title Page, in Item (56), under "OTHER PUBLICATIONS", in Column 2, Line 2, delete "201-220:" and insert -- 201-220; --, therefor.

On the Title Page, in Item (56), under "OTHER PUBLICATIONS", in Column 2, Line 9, delete "1000-11304:" and insert -- 1000-1004; --, therefor.

On the Title Page, in Item (56), under "OTHER PUBLICATIONS", in Column 2, Line 12, delete "far" and insert -- for --, therefor.

On the Title Page, in Item (56), under "OTHER PUBLICATIONS", in Column 2, Line 13, delete "pgs:" and insert -- pgs; --, therefor.

On the Title Page, in Item (56), under "OTHER PUBLICATIONS", in Column 2, Lines 14-16, delete "Roberts, Brown and Loomis, Jr.;.........SP Magazine; USA.".

On the Title Page, in Item (56), under "OTHER PUBLICATIONS", in Column 2, Line 22, delete "420-430:" and insert -- 420-430; --, therefor.

On Title Page 2, in Item (56), under "OTHER PUBLICATIONS", in Column 1, Line 6, delete "2094-2098:" and insert -- 2094-2098; --, therefor.

On Title Page 2, in Item (56), under "OTHER PUBLICATIONS", in Column 2, Line 5, delete "eflcient" and insert -- efficient --, therefor.

In the Drawings:

In Fig. 2, Sheet 2 of 10, below "PROCESSOR (210)", in Line 1, delete "uP/uC" and insert -- μP/ μC --, as shown on the attached page.

Signed and Sealed this
Twenty-ninth Day of October, 2013

Teresa Stanek Rea
*Deputy Director of the United States Patent and Trademark Office*

In Fig. 11, Sheet 9 of 10, for Tag "1105", in Line 1, delete "Pa" and insert -- $P_a$ --, as shown on the attached page.

In the Specifications

In Column 4, Line 15, delete "(HDD)," and insert -- (HDDs), --, therefor.

In Column 4, Line 17, delete "(SSD)," and insert -- (SSDs), --, therefor.

In Column 5, Line 30, delete "$x_1$ [n]," and insert -- $x_1[n]$, --, therefor.

In Column 5, Line 35, delete "$a_1$ [n]" and insert -- $a_1[n]$ --, therefor.

In Column 5, Line 37, delete "$x_1$ [n]" and insert -- $x_1[n]$ --, therefor.

In Column 5, Line 43, delete "$a_1$ [n]" and insert -- $a_1[n]$ --, therefor.

In Column 6, Line 14, delete "$x(z)=(z)a(z)$" and insert -- $x(z) = H(z)a(z)$ --, therefor.

In Column 9, Line 26, delete "(SQRC)" and insert -- (SRRC) --, therefor.

In Column 14, Line 16, delete "making" and insert -- making. --, therefor.

In the Claims

In Column 17, Line 55, in Claim 13, delete "equalize" and insert -- equalizer --, therefor.

In Column 18, Line 14, in Claim 15, delete "inure" and insert -- more --, therefor.

In Column 18, Line 40, in Claim 21, delete "Output" and insert -- output --, therefor.

UNITED STATES PATENT AND TRADEMARK OFFICE
CERTIFICATE OF CORRECTION

| | | |
|---|---|---|
| PATENT NO. | : 8,295,341 B2 | Page 1 of 1 |
| APPLICATION NO. | : 12/609011 | |
| DATED | : October 23, 2012 | |
| INVENTOR(S) | : Bose et al. | |

It is certified that error appears in the above-identified patent and that said Letters Patent is hereby corrected as shown below:

On the Title Page, in Column 1, below Item "(76)",
insert -- (73) Assignee: Virginia Tech Intellectual Properties, Inc., Blacksburg, VA (US) --.

Signed and Sealed this
Eleventh Day of February, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,295,341 B2 | Page 1 of 1 |
| APPLICATION NO. | : 12/609011 | |
| DATED | : October 23, 2012 | |
| INVENTOR(S) | : Bose et al. | |

It is certified that error appears in the above-identified patent and that said Letters Patent is hereby corrected as shown below:

On the Title Page, "item (76)" should read -- item (75) --.

On the Title Page, in Column 1, below Item "(76)",
insert -- (73) Assignee: Virginia Tech Intellectual Properties, Inc., Blacksburg, VA (US) --.

This certificate supersedes the Certificate of Correction issued February 11, 2014.

Signed and Sealed this
Eighteenth Day of March, 2014

Michelle K. Lee
*Deputy Director of the United States Patent and Trademark Office*